United States Patent
Lenz et al.

(10) Patent No.: US 8,505,188 B2
(45) Date of Patent: Aug. 13, 2013

(54) CLOSURE DEVICE FOR CLOSING A CONTAINER, AND METHOD OF PRODUCING SUCH A CLOSURE DEVICE

(75) Inventors: Franz Lenz, Hinterschmieding (DE); Gerhard F. K. Jäckel, Freyung (DE)

(73) Assignee: Aptar Freyung GmbH (DE)

( * ) Notice: Subject to any disclaimer, the term of this patent is extended or adjusted under 35 U.S.C. 154(b) by 474 days.

(21) Appl. No.: 12/298,671

(22) PCT Filed: May 19, 2006

(86) PCT No.: PCT/EP2006/004775
§ 371 (c)(1),
(2), (4) Date: Dec. 17, 2008

(87) PCT Pub. No.: WO2007/134618
PCT Pub. Date: Nov. 29, 2007

(65) Prior Publication Data
US 2009/0314792 A1    Dec. 24, 2009

(51) Int. Cl.
*B23P 17/00* (2006.01)
*B29C 45/14* (2006.01)
*B65D 51/18* (2006.01)
*B65D 25/48* (2006.01)

(52) U.S. Cl.
USPC ....... 29/527.1; 220/254.3; 215/243; 264/516; 222/567

(58) Field of Classification Search
USPC .................. 220/254.5, 254.1, 818, 817, 810, 220/FOR. 195, FOR. 192, FOR. 203; 215/243, 215/237, 316, 200; 222/556, 562, 544, 569, 222/153.1; 264/516, 512, 510, 295; 29/527.1, 29/469
IPC  B65D 47/08, 51/18, 47/04, 25/48, 25/40; B23P 17/00; B29C 45/14
See application file for complete search history.

(56) References Cited

U.S. PATENT DOCUMENTS

| | | | | |
|---|---|---|---|---|
| 1,502,996 A | * | 7/1924 | Loetscher | 220/291 |
| 4,170,315 A | * | 10/1979 | Dubach et al. | 220/281 |
| 4,414,705 A | * | 11/1983 | Ostrowsky | 16/225 |
| 4,457,458 A | * | 7/1984 | Heinol | 222/498 |

(Continued)

FOREIGN PATENT DOCUMENTS

| EP | 1 582 475 A1 | 10/2005 |
|---|---|---|
| EP | 1582475 A1 | 10/2005 |

(Continued)

OTHER PUBLICATIONS

Translation of WO 03/026981 (Jackel et al.) Apr. 3, 2003. pp. 2-5.*

(Continued)

*Primary Examiner* — Robert J Hicks
(74) *Attorney, Agent, or Firm* — Wood, Phillips, Katz, Clark & Mortimer

(57) ABSTRACT

The invention relates to a closure device having a two-part base element and a hinged cap pivotally fastened to the base element and movable between a closed and an open setting. The base element is configured in two parts, with one part being a substantially annular fastening element and the other part being a dome-shaped dispensing element inserted into the substantially annular fastening element. The invention also relates to a method of producing such a closure device.

9 Claims, 3 Drawing Sheets

(56) References Cited

U.S. PATENT DOCUMENTS

| | | | | |
|---|---|---|---|---|
| 4,671,421 A | * | 6/1987 | Reiber et al. | 215/228 |
| 4,749,108 A | * | 6/1988 | Dornsbusch et al. | 222/212 |
| 5,065,912 A | * | 11/1991 | Rosenthal | 222/517 |
| 5,407,087 A | * | 4/1995 | Giblin et al. | 215/260 |
| 5,642,824 A | * | 7/1997 | Hess et al. | 215/235 |
| 5,934,514 A | | 8/1999 | Lampe et al. | |
| 6,269,986 B1 | | 8/2001 | Gross | |
| 6,851,586 B2 | | 2/2005 | Odet | |
| 2005/0087571 A1 | * | 4/2005 | Dark | 222/544 |

FOREIGN PATENT DOCUMENTS

| | | |
|---|---|---|
| FR | 2 804 089 | 7/2001 |
| WO | 02060776 A1 | 8/2002 |
| WO | WO 02/060776 A1 | 8/2002 |
| WO | WO 03026981 A1 * | 4/2003 |

OTHER PUBLICATIONS

Translation of WO/03026981 (Jackel et al.) Apr. 3, 3002, pp. 1-5.*
PCT International Preliminary Report on Patentability for PCT/EP2006/004775.
English language translations of Chinese Office Actions of Mar. 23, 2010 and Aug. 30, 2010 issued in the counterpart Chinese patent application.
Office Action of Feb. 6, 2013 issued in the counterpart Canadian patent application.

* cited by examiner

CLOSURE DEVICE FOR CLOSING A CONTAINER, AND METHOD OF PRODUCING SUCH A CLOSURE DEVICE

FIELD OF THE INVENTION

The invention relates to a closure device for a container, especially bottles, this closure device comprising a base element, which can be fastened on an opening of the container, and a hinged cap, which is pivotably fastened to the base element, so that said cap can be moved to and fro between a closed and an open setting to allow a free-flowing medium, in particular, to be dispensed from the bottle. The present invention further relates to a method of producing such a closure device.

BACKGROUND OF THE INVENTION

Closure devices are known in a variety of forms and are usually made of a plastics material. A base element typically comprises a device for fastening the base element to an opening of the container, for example to a bottle neck, an internal thread being able to be provided, for example, so that the closure device can be screwed onto the bottle neck.

Extending from the base element there is frequently a dome-shaped spout, which can be enclosed by the mouth of the drinker, for example, including when drinking from the container.

BRIEF SUMMARY OF THE INVENTION

An object of the present invention is to provide an improved closure device in which, in particular, the closure of the hinged cap can be realized particularly easily, at the same time as the dispensing opening is guaranteed to be tightly sealed when the cap is closed, yet in which the respective sealing elements can also be protected from damage even under repeated opening and closing.

This object is met by a closure device according to claim 1, claims 2 to 10 relating to particularly advantageous embodiments of such a closure device. The object is further achieved by a method according to claim 12 of producing a closure device of the kind described in claims 1 to 10. Claims 13 and 14 relate to particularly advantageous realizations of such a method. The invention further relates to a component for a closure device according to claim 11.

According to the invention, the base element is configured in two parts and comprises, firstly, a substantially annular fastening element and, secondly, a substantially dome-shaped dispensing element, which is provided with a dispensing opening and which is inserted into the base element. In addition, the hinged cap of the closure device comprises a substantially annular projection (sometimes also referred to as a shoulder), which is configured such that, in a closed state of the hinged element, it engages in the dispensing opening of the dispensing element and thereby closes off the dispensing opening.

Finally, according to the invention, the hinged cap is fastened to the base element by means of a hinge device providing at least two mutually independent and spaced apart pivot axes.

The above-described combination of features has the advantage that, when the hinged cap is closed, a very secure sealing of the dispensing opening is ensured, and yet, upon closure of the hinged cap by means of a pivot motion, a motion of the hinged cap which prevents or severely reduces wear to the sealing elements, namely of the annular projection, on the one hand, and to therewith interacting elements of the dispensing element, on the other hand, is also possible, particularly through the provision of two spaced-apart, independent pivot axes.

Particularly through the provision of the two spaced-apart, independent pivot axes, a relative motion of the above-described sealing elements, i.e. of the annular projection, on the one hand, and of the therewith interacting elements of the dispensing element, on the other hand, can be realized, which differs from a pure circular motion which would be found in the case of just one pivot axis, so that, when the cap is put on and a seal is formed, smaller deformations are necessary and thus less wear is ensured.

The additional provision of a two-part base element, which comprises an annular fastening element, on the one hand, and a substantially dome-shaped dispensing element, on the other hand, further allows the fastening element and the hinged cap to be produced separate from the dispensing element by injection molding and the hinged cap to be brought into the closed position, and, only thereafter, the dispensing element to be inserted into the fastening element of the base element. This has the advantage that, particularly in the production process, i.e. during the first operation, in which the closure device must be brought into a leak-tight state, the dispensing element can be inserted in a linear motion from below, i.e. in the closing operation no circular motional component is necessary, which ensures the minimum possible wear and a high level of leak-tightness.

The combination of the above-described features has the advantage, in particular, that a high leak-tightness is obtainable, specifically in the production process, which is of particular importance since, it is precisely the leak-tightness in the production process, i.e. prior to initial opening by the user, which is particularly important to prevent liquid from escaping from the container, for example as the filled containers are transported to the sales outlets. Since, in particular, it can be ensured that no wearing or faulty positioning of individual elements occurs in the production process and also, preferably, different materials are used, one of the materials being softer, it is also possible to dispense with an additional sealing element, for example a sealing washer, which in a number of closure devices has to be provided and which is placed directly onto the opening of the container and fastened by the closure device.

In a preferred embodiment, the pivot axes run substantially parallel to each other, the distance apart of the pivot axes preferably amounting to at least 5%, in a particularly preferred embodiment, at least 10% or even 15%, of the diameter of the closure device or of the opening of the container.

Preferably, the two pivot axes are realized by a main hinge, on the one hand, and by a film hinge, on the other hand, but it is also possible to provide two substantially identical hinges.

In one embodiment, the main hinge is configured such that a pivot range of at least 90°, preferably 120° and, in a particularly preferred embodiment, 180° or more, is enabled, while a second hinge, preferably a film hinge, allows only a smaller, additional pivot range, for example +/−20° or +/−30°, to allow a "fine adjustment" of the motion. The main hinge with the larger pivot range therefore serves, as it were, essentially for the opening motion of the hinged cap, while the second hinge, preferably a film hinge, with a smaller pivot range, possibly almost imperceptibly for the user, essentially automatically controls a fine adjustment of the positioning of the hinged cap, or of the annular projection (the shoulder) disposed therein, relative to the dispensing opening, namely following the course of least resistance, so that wear is largely prevented.

This is especially important in a particularly preferred embodiment in which the dispensing element is made of a different material than the fastening element, in particular of a more elastic or softer material, while the provision of an, at least partially, plastically deformable material is also conceivable.

In a preferred embodiment, the base element and the hinged cap consist either of polypropylene (PP) or polyethylene (PE). The dispensing element can likewise consist of PP or PE, in a preferred embodiment the base element and the hinged cap being made of PP, and the dispensing element of PE.

In a preferred embodiment, the substantially dome-shaped dispensing element comprises, on its outer or upper end of the dispensing opening, sealing lips, which are preferably arranged internally, so that these sealing lips, in a closed state of the hinged cap, bear against the annular projection jutting into the dispensing opening, in order to produce a high leak-tightness. Preferably, these sealing lips are of U-shaped configuration, preferably extending inward and outward, i.e. remote from the outer dispensing opening, in the direction of the inner region of the dome-shaped elevation and thus in the direction of the opening of the container.

In one particular embodiment, the annular projection of the hinged cap is of substantially conical configuration, so that it forms a so-called sealing cone. The conical embodiment has the advantage, in particular, that, upon closure of the hinged cap, an automatic centering and adjustment of the position, particularly when utilizing the pivot ranges of both hinges, is ensured, which likewise prevents damage and wear, and hence a high leak-tightness, even under repeated opening and closing of the hinged cap.

In a preferred embodiment, the dispensing element further comprises an additional diaphragm valve, which is preferably fastened in the dispensing element. Such a diaphragm valve can also be provided at a different position, however, for example in the base element.

The invention further relates to a method of producing a closure device of the above-described kind, wherein the annular fastening element of the base element and the hinged cap are produced in one piece and in an open state, preferably by injection molding, whereafter the hinged cap is brought into its closed state and only then is the dispensing element inserted into the base element. This ensures, particularly in the original production process and in the first "sealing process", that the dispensing element can be inserted into the annular fastening element of the base element only in a substantially linear motion, and hence the annular projection is inserted in a straight line and exactly into the fastening element, so that a deformation of the dome-shaped dispensing element is, as far as possible, prevented, in other words only such deformation takes place which is necessary for the secure sealing.

Preferably, the annular fastening element and the hinged cap are produced in one piece by injection molding, an injection molding process also being suitable for the dispensing element. In a particularly preferred embodiment, the insertion of the dispensing element into the "closed system" comprising annular fastening element and hinged cap, takes place at a moment in which the dispensing element is not yet fully crystallized and/or not yet fully cooled.

BRIEF DESCRIPTION OF THE DRAWINGS

These and other features and advantages of the invention are explained with reference to the appended drawings, which schematically show one particular embodiment of the closure device according to the invention, wherein.

DETAILED DESCRIPTION OF THE PREFERRED EMBODIMENTS

Figure 1:
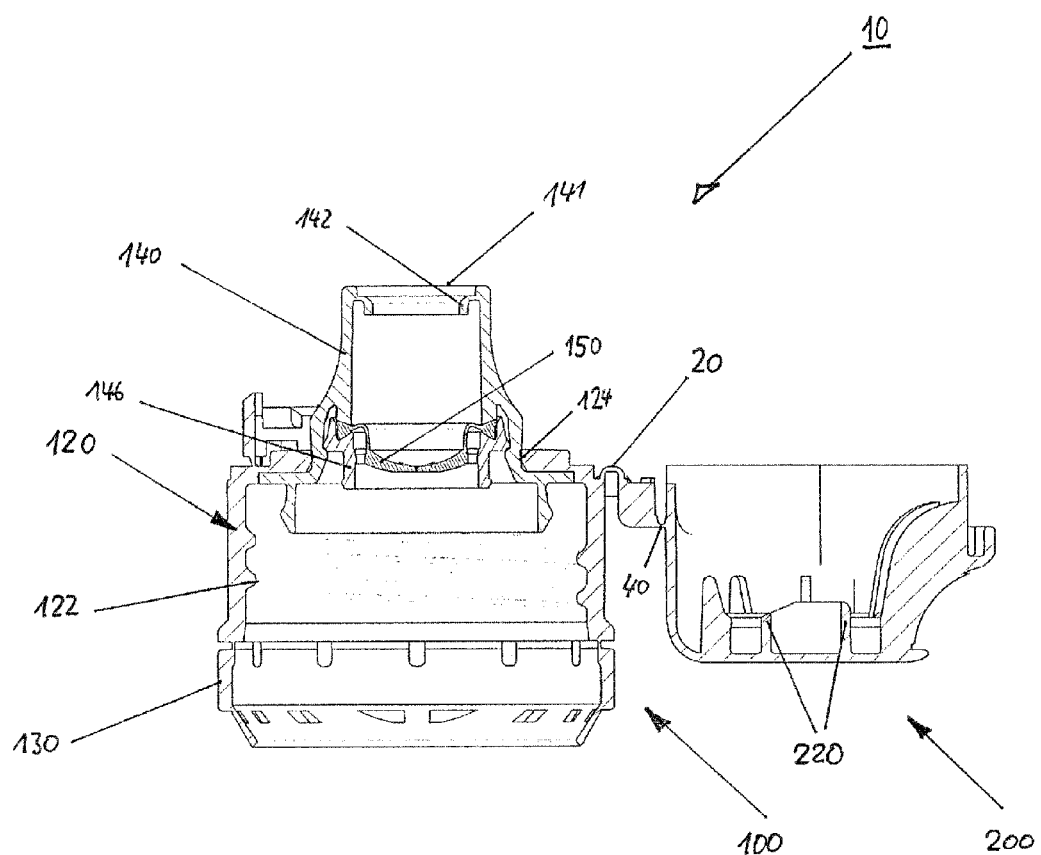
FIG. 1 shows a first embodiment of a closure device according to the invention in its open state.

FIG. 1 shows a first embodiment of an inventive closure device 10 for a container (not shown), having a base element 100, which comprises an annular fastening element 120 and a dispensing element 140, and a hinged cap 200, wherein the hinged cap 200 is in its open position and is pivoted through about 180° out of its closed position.

The fastening element 120 of the base element 100 is provided with an internal thread 122, so that it can be screwed onto a corresponding opening of the container, in particular a bottle neck. The fastening element 120 further comprises a security band 130, which is arranged on its lower end.

Configured in one piece with this fastening element 120 is a hinged cap 200, this being fastened by means of two hinge devices, a main hinge 20 and a film hinge 40, to the fastening element 120. The main hinge 20 is used to ensure the pivoting of the hinged cap through 180°, while the film hinge 40, in the setting shown in FIG. 1, is in its neutral position, wherein it can be pivoted, by subjection to load, through an additional angular range of about +/−20°, irrespective of the position or setting of the main hinge 20.

A dispensing element 140, which is produced as a part independent from the annular fastening element 120, is inserted into an opening 124 of the annular fastening element 120 and fastened thereto. The dispensing element 140 is of substantially dome-shaped configuration, having an upward tapering outer contour.

Figure 2:
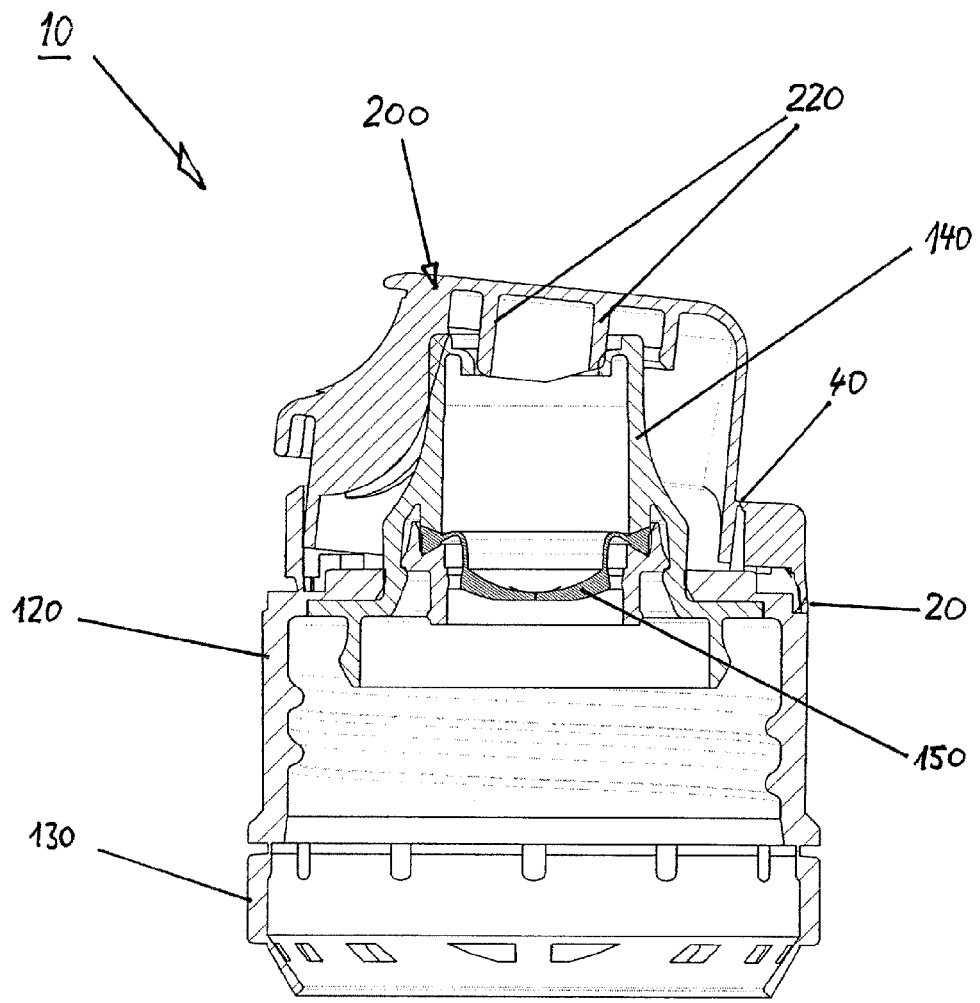
FIG. 2 shows the embodiment shown in FIG. 1 with a partially closed hinged cap.

Close to the dispensing opening 141 of the dispensing element 140, on the inner side, a sealing lip 142 is disposed, which extends inward and downward essentially in a U-shape, so that, when the cap is closed, these sealing lips 142 can interact with associated elements of the hinged cap, see, in particular, FIG. 2.

In this embodiment, furthermore, a diaphragm valve 150 has been introduced into the dispensing element 140, which diaphragm valve is held securely in the dispensing element 140 by means of a fastening element 146.

The hinged cap 200 comprises a substantially annular projection 220, which is arranged on an inner side of the hinged cap, this annular projection 220 being configured such that, in a closed state, it interacts with the dispensing element 140 for a sealing of the dispensing opening 141, see, in particular, FIG. 2 in this regard.

FIG. 2 shows that embodiment of a dispensing closure according to the invention which is represented in FIG. 1, in which, however, the hinged cap 200 is in an almost closed position. In this position, the annular projection 220 is already engaging in the dispensing opening 141 of the dispensing element 140 and is bearing against the sealing lip 142 of the dispensing element 140.

FIG. 2 shows particularly clearly the fine positioning of the hinged cap which is possible as a result of the two different pivot axes, wherein, in the position shown in FIG. 2, the main hinge 20 is essentially already in its closed position, whereas the film hinge is moved out of its neutral setting, so that the top part of the hinged cap, as before, is slightly tilted relative to the base element and the dispensing element. This ensures that the dispensing element has to be "deformed" only very slightly, which, as explained, ensures very low wear and a high leak-tightness even after repeated opening and closing of the hinged cap.

In order to prevent repetitions, reference is made, with regard to the other elements, to the description for FIG. 1.

Figure 3:
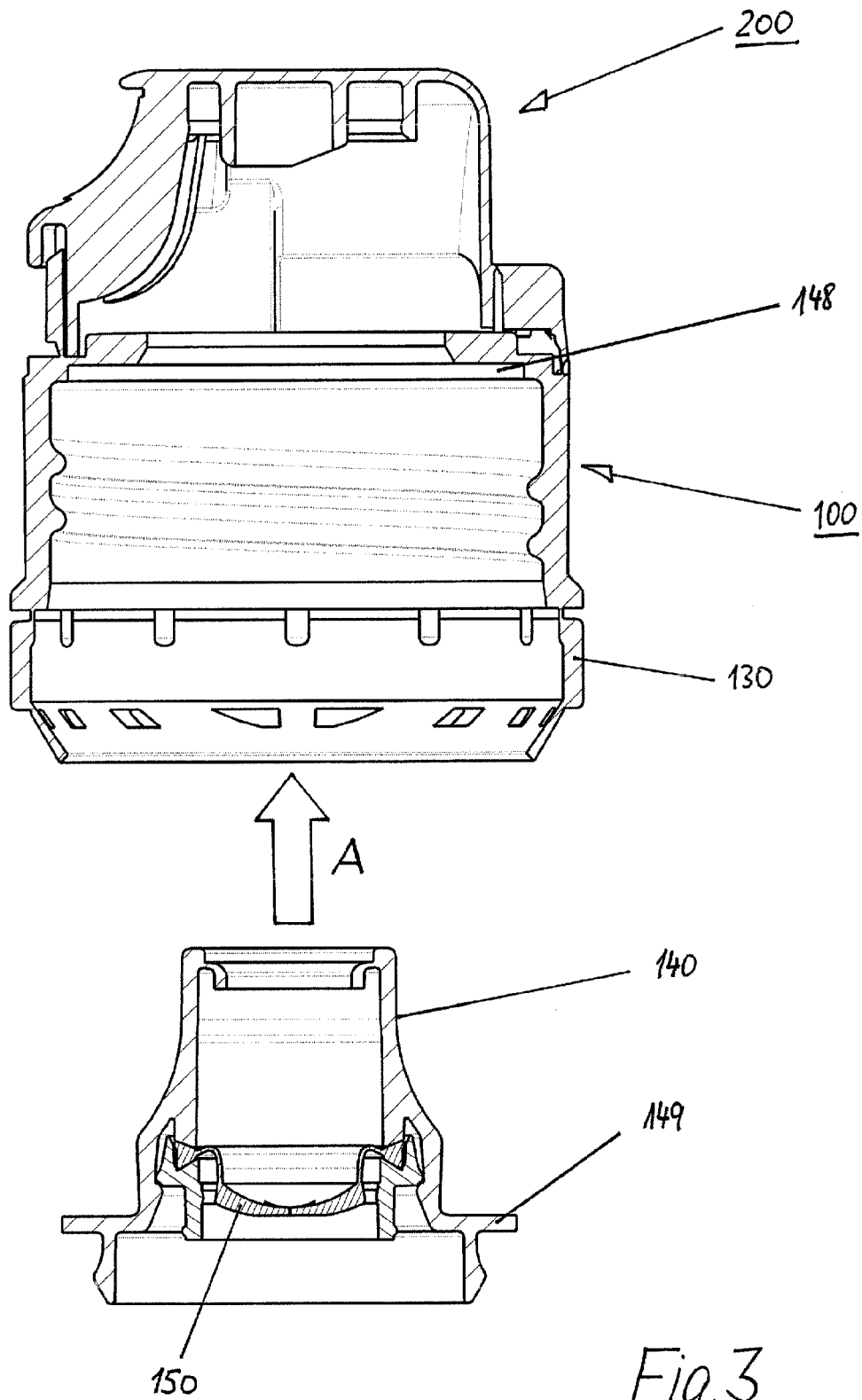
FIG. 3 shows the elements shown in FIG. 1, the dispensing element being not yet inserted in the annular fastening element.

FIG. 3 shows another embodiment of a closure device according to the invention, wherein in this representation the hinged cap 200 is in a fully closed position, while FIG. 3 further shows how, in the production method according to the invention, the dispensing element 140 is only used (see arrow A) once the hinged cap is in its closed position, in order here, particularly in the production process, to prevent a deformation of the dispensing element extending beyond the deformation necessary for the sealing.

In addition, the upper part of FIG. 3 represents a component for a closure device according to the invention, which comprises the annular fastening element 120 and the hinged cap 200, but not the dispensing element 140, and which, where appropriate, is offered and sold singly on the market, so that dispensing elements 140 can be subsequently inserted into the corresponding component for the closure device. FIG. 3 also clearly shows a recess 148, into which a corresponding mating element 149 of the dispensing element can be inserted.

The features of the invention which are disclosed in the claims, the description and the drawings can be essential to the realization of the invention, both individually and in a chosen combination.

What is claimed is:

1. A method of producing a closure device having a base element, which can be fastened on an opening of a container, and a hinged cap, which is pivotably fastened to the base element and can be moved to and fro between a closed and an open setting, wherein the base element is configured in two parts and comprises a substantially annular fastening element, in which a substantially dome-shaped dispensing element having a dispensing opening is inserted, characterized in that the annular fastening element of the base element and the hinged cap are produced in one piece and in an open state, whereafter the hinged cap is brought into a closed position and only then is the dispensing element inserted into the annular fastening element.

2. The method of producing a closure device as claimed in claim 1, characterized in that the annular fastening element of the base element and the hinged cap and/or the dispensing element are produced by injection molding.

3. The method of producing a closure device as claimed in claim 1, characterized in that the insertion of the dispensing element takes place at a moment in which the dispensing element is not yet fully cooled after its production.

4. A method of producing a closure device having a base element, which can be fastened on an opening of a container, and a hinged cap, which is pivotably fastened to the base element and can be moved to and fro between a closed and an open setting, wherein the base element is configured in two parts and comprises a substantially annular fastening element, in which a substantially dome-shaped dispensing element having a dispensing opening is inserted, characterized in that the annular fastening element of the base element and the hinged cap are produced in one piece and in an open state, whereafter the hinged cap is brought into a closed position and only then is the dispensing element inserted into the annular fastening element and sealingly engaging the dispensing opening with the hinged cap.

5. The method of producing a closure device as claimed in claim 4, characterized in that the annular fastening element of the base element and the hinged cap and/or the dispensing element are produced by injection molding.

6. The method of producing a closure device as claimed in claim 4, characterized in that the insertion of the dispensing element takes place at a moment in which the dispensing element is not yet fully cooled after its production.

7. A method of producing a closure device having a base element, which can be fastened on an opening of a container, and a hinged cap, which is pivotably fastened to the base element and can be moved to and fro between a closed and an open setting, wherein the base element is configured in two parts and comprises a substantially annular fastening element, in which a substantially dome-shaped dispensing element having a dispensing opening is inserted, characterized in that the annular fastening element of the base element and the hinged cap are produced in one piece and in an open state, whereafter the hinged cap is brought into a closed position and only then is the dispensing element inserted into the annular fastening element and sealingly engaging an annular projection of the cap in the dispensing opening.

8. The method of producing a closure device as claimed in claim 7, characterized in that the annular fastening element of the base element and the hinged cap and/or the dispensing element are produced by injection molding.

9. The method of producing a closure device as claimed in claim 7, characterized in that the insertion of the dispensing element takes place at a moment in which the dispensing element is not yet fully cooled after its production.

* * * * *